United States Patent
Mapp

(12) 
(10) Patent No.: US 11,832,746 B2
(45) Date of Patent: Dec. 5, 2023

(54) EGG CUP WITH KNIFE GUIDE

(71) Applicant: Paul David Mapp, Brooklyn Park (AU)

(72) Inventor: Paul David Mapp, Brooklyn Park (AU)

(*) Notice: Subject to any disclaimer, the term of this patent is extended or adjusted under 35 U.S.C. 154(b) by 439 days.

(21) Appl. No.: 17/164,341

(22) Filed: Feb. 1, 2021

(65) Prior Publication Data

US 2022/0240698 A1    Aug. 4, 2022

(51) Int. Cl.
*A47G 19/28* (2006.01)
*A47J 43/14* (2006.01)

(52) U.S. Cl.
CPC .............. *A47G 19/28* (2013.01); *A47J 43/14* (2013.01)

(58) Field of Classification Search
CPC . A47J 43/14; A47J 29/06; A47J 29/02; A47G 19/28; A47G 19/285; A23L 15/00; B26B 29/063
See application file for complete search history.

(56) References Cited

U.S. PATENT DOCUMENTS

| | | | | |
|---|---|---|---|---|
| 824,748 A * | 7/1906 | Schneider | ............... | A47G 19/28 99/582 |
| 844,287 A * | 2/1907 | Provandie | ............. | B26B 29/063 83/762 |
| 1,419,905 A * | 6/1922 | Hostetter | ............... | B65D 11/02 217/29 |
| 1,955,258 A * | 4/1934 | Smith | ..................... | A47G 19/28 99/582 |
| 2,089,980 A * | 8/1937 | Owen | ................... | B26B 29/063 D7/673 |
| 2,108,992 A * | 2/1938 | Obenshain | ............ | B26B 29/063 83/762 |
| 2,283,390 A * | 5/1942 | Seldomridge | ........... | A47J 29/06 99/440 |
| 2,464,307 A * | 3/1949 | Griffin | ..................... | A47J 29/06 99/440 |
| 2,481,579 A * | 9/1949 | Dolezal | .................. | A47G 19/28 99/578 |
| 2,548,667 A * | 4/1951 | Gruss | ..................... | A47G 19/28 99/578 |
| 2,802,686 A * | 8/1957 | Ramsey | ................. | A47G 19/28 99/582 |

(Continued)

FOREIGN PATENT DOCUMENTS

| | | | | |
|---|---|---|---|---|
| DE | 19547446 A1 * | 6/1997 | ............. | A47G 19/28 |
| DE | 19623210 A1 * | 12/1997 | ............. | A47G 19/28 |

(Continued)

*Primary Examiner* — Patrick D Hawn
(74) *Attorney, Agent, or Firm* — Eric Karich; Karich & Associates

(57) ABSTRACT

An egg cup for cutting an egg with a knife has a main body with a base and an upwardly extending sidewall that extends upwardly to a top perimeter. The top perimeter defines an opening that allows access to an interior chamber formed by the main body, wherein the interior chamber is shaped to receive the egg. The egg cup further has a top ring having a connector that connects to the top ring to the top perimeter such that the top ring and the top perimeter form a gap therebetween. The gap is sized to receive the knife between the top ring and the top perimeter so that the knife may slice through the egg and stop at the connector of the top ring.

5 Claims, 4 Drawing Sheets

(56) References Cited

U.S. PATENT DOCUMENTS

| | | | | |
|---|---|---|---|---|
| 3,973,482 | A * | 8/1976 | Khee | A47G 19/28 |
| | | | | 99/537 |
| 5,287,979 | A * | 2/1994 | Bourgeois | A47G 19/24 |
| | | | | 220/523 |
| 5,718,158 | A * | 2/1998 | Rogge | A21C 15/04 |
| | | | | 83/870 |
| 5,927,701 | A * | 7/1999 | Chapman | B26D 3/30 |
| | | | | 269/295 |
| 5,946,998 | A * | 9/1999 | Thompson | B26B 29/063 |
| | | | | 83/870 |
| 6,202,529 | B1 * | 3/2001 | Hodsdon | B26B 29/063 |
| | | | | 83/761 |
| 6,543,322 | B2 * | 4/2003 | Skoko | B26D 3/30 |
| | | | | 83/13 |
| 7,455,005 | B2 * | 11/2008 | Giessler | B26B 29/063 |
| | | | | 83/605 |
| 7,673,767 | B2 * | 3/2010 | Vovan | B65D 51/20 |
| | | | | 220/744 |
| 10,251,506 | B1 * | 4/2019 | Nolin | A23L 15/00 |
| 2020/0170427 | A1 * | 6/2020 | Lord | A23L 15/00 |

FOREIGN PATENT DOCUMENTS

| | | | | |
|---|---|---|---|---|
| DE | 20010001 | U1 * | 9/2000 | A47G 19/28 |
| DE | 202004016901 | U1 * | 2/2005 | A47G 19/28 |
| DE | 102014106788 | A1 * | 11/2015 | A47G 19/28 |
| DE | 102014113131 | A1 * | 3/2016 | A47G 19/28 |
| EP | 2944231 | A1 * | 11/2015 | A47G 19/28 |
| GB | 2523011 | A * | 8/2015 | A47G 19/28 |

* cited by examiner

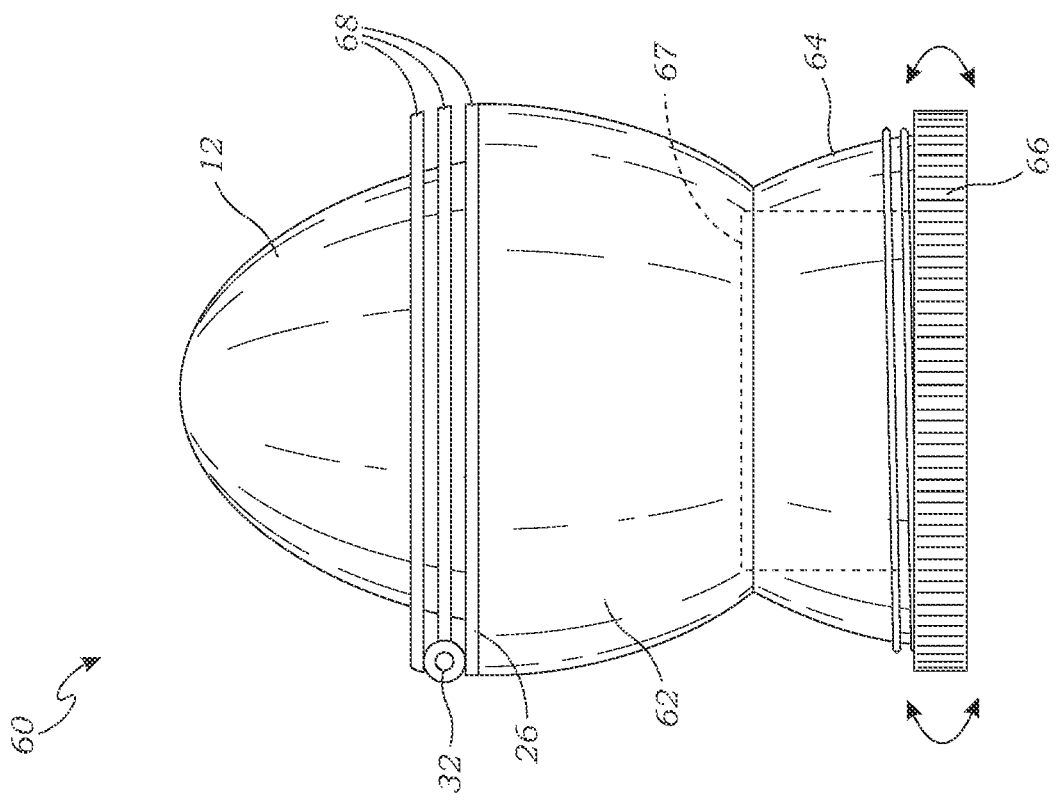
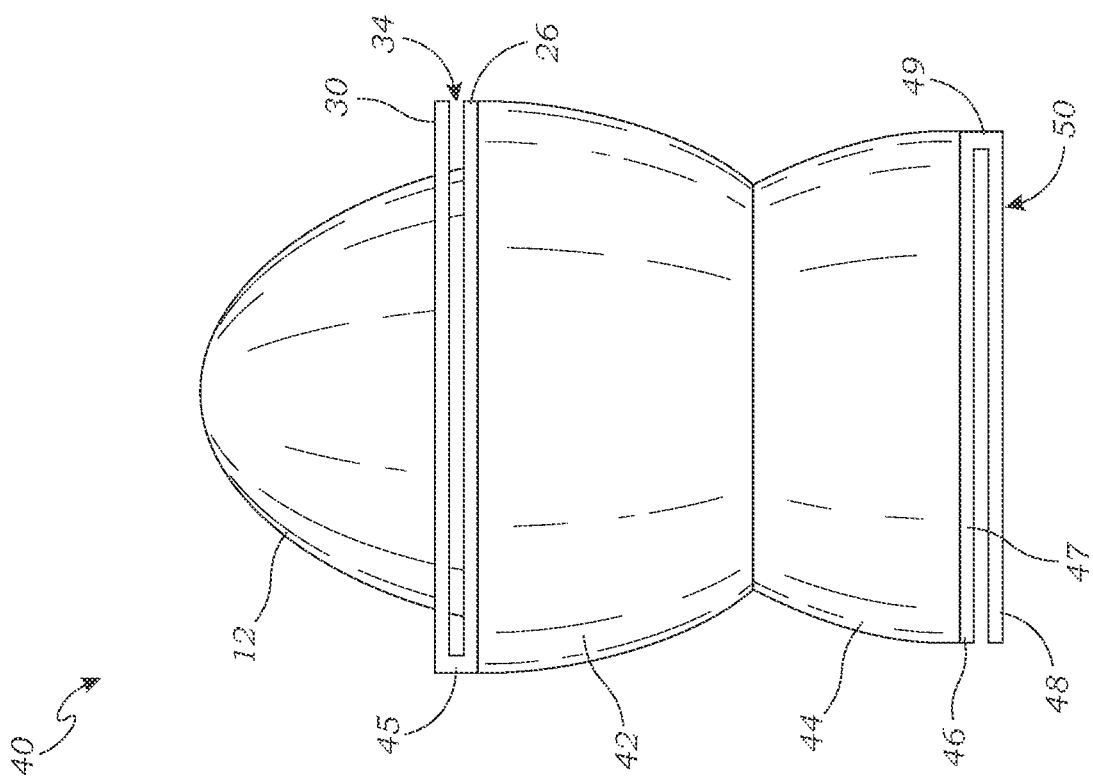

EGG CUP WITH KNIFE GUIDE

BACKGROUND OF THE INVENTION

Field of the Invention

This invention relates generally to egg cups, and more particularly to an egg cup with a knife guide for cutting an egg.

Description of Related Art

Prior art egg cups are generally devised to serve eggs for eating, wherein the egg sits "on" the cup for accessing it while eating. In some cases an egg "topper" or slicing tool is used to remove the egg's shell or to break apart the egg. However, these tools are generally imprecise, and if used in conjunction with an egg cup, lack stability.

The prior art teaches egg cups and egg slicing tools. However, the prior art does not teach an egg cup that includes a knife guide for slicing an egg. The present invention fulfills these needs and provides further advantages as described in the following summary.

SUMMARY OF THE INVENTION

The present invention teaches certain benefits in construction and use which give rise to the objectives described below.

The present invention provides an egg cup for cutting an egg with a knife. The egg cup comprises a main body having a base and an upwardly extending sidewall that extends upwardly to a top perimeter. The top perimeter defines an opening that allows access to an interior chamber formed by the main body, wherein the interior chamber is shaped to receive the egg. The egg cup further has a top ring having a connector that connects to the top ring to the top perimeter such that the top ring and the top perimeter form a gap therebetween. The gap is sized to receive the knife between the top ring and the top perimeter so that the knife may slice through the egg and stop at the connector of the top ring.

A primary objective of the present invention is to provide an egg cup having advantages not taught by the prior art.

Another objective is to provide an egg cup having a knife guide for slicing an egg.

A further objective is to provide an egg cup that is deep enough for an egg to be securely held therewithin.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 4 is a front elevational view of a second embodiment of the egg cup; and

FIG. 5 is a front elevational view of a third embodiment of the egg cup.

DETAILED DESCRIPTION OF THE INVENTION

The above-described drawing figures illustrate the invention, an egg cup for cutting an egg with a knife.

Figure 1:
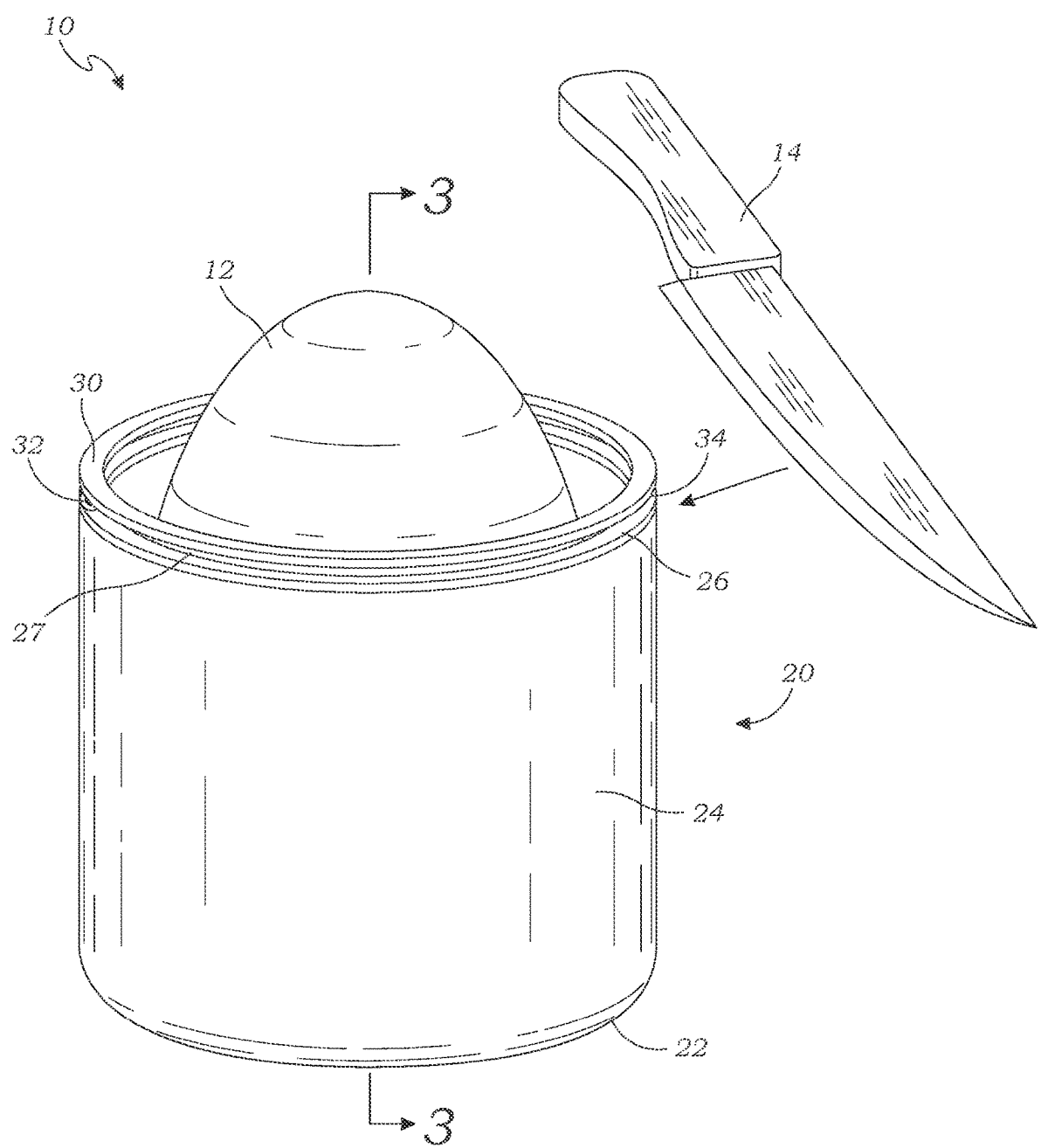
FIG. 1 is a perspective view of an egg inside an egg cup according to one embodiment of the present invention and showing a knife for slicing the egg.

FIG. 1 is a perspective view of an egg 12 inside an egg cup 10 according to one embodiment of the present invention and showing a knife 14 for slicing the egg 12. As shown in FIG. 1, the egg cup 10 comprises a main body 20 having a base 22 and an upwardly extending sidewall 24 that extends upwardly to a top perimeter 26. The top perimeter 26 defines an opening 27 that allows access to an interior chamber 28 formed by the main body 20, wherein the interior chamber 28 is shaped to receive the egg 12 (i.e., it is rounded in shape). In this embodiment, the upwardly extending sidewall 24 is generally cylindrical in shape, but in other embodiments it may be any shape (e.g., rectangular, irregular, etc.) that can include the interior chamber 28. The egg cup 10 further includes a top ring 30 having a connector 32 that connects the top ring 30 to the top perimeter 26 such that the top ring 30 and the top perimeter 26 form a gap 34 therebetween.

The connector 32 and/or top ring 30 may be fixedly attached to the top perimeter 26, but in other implementations may be removably attached or adjustable. As shown in FIG. 1, the connector 32 may be in the form of a hinge, but alternatives may also be used, as shown in FIGS. 4-5 and discussed below. In this embodiment, the top ring 30 and the top perimeter 26 are each formed or plated with stainless steel material, but any suitable material may be used (i.e., plastics, other metals, etc.). The top ring 30 may be smaller in diameter than the top perimeter 26 for securing the tapered end of the egg 12, but the top ring 30 and the top perimeter 26 may alternatively be approximately equal in diameter. The gap 34 is sized to receive the knife 14 between the top ring 30 and the top perimeter 26 so that the knife 14 may slice through the egg 12 and stop at the connector 32 of the top ring 30.

Figure 2:
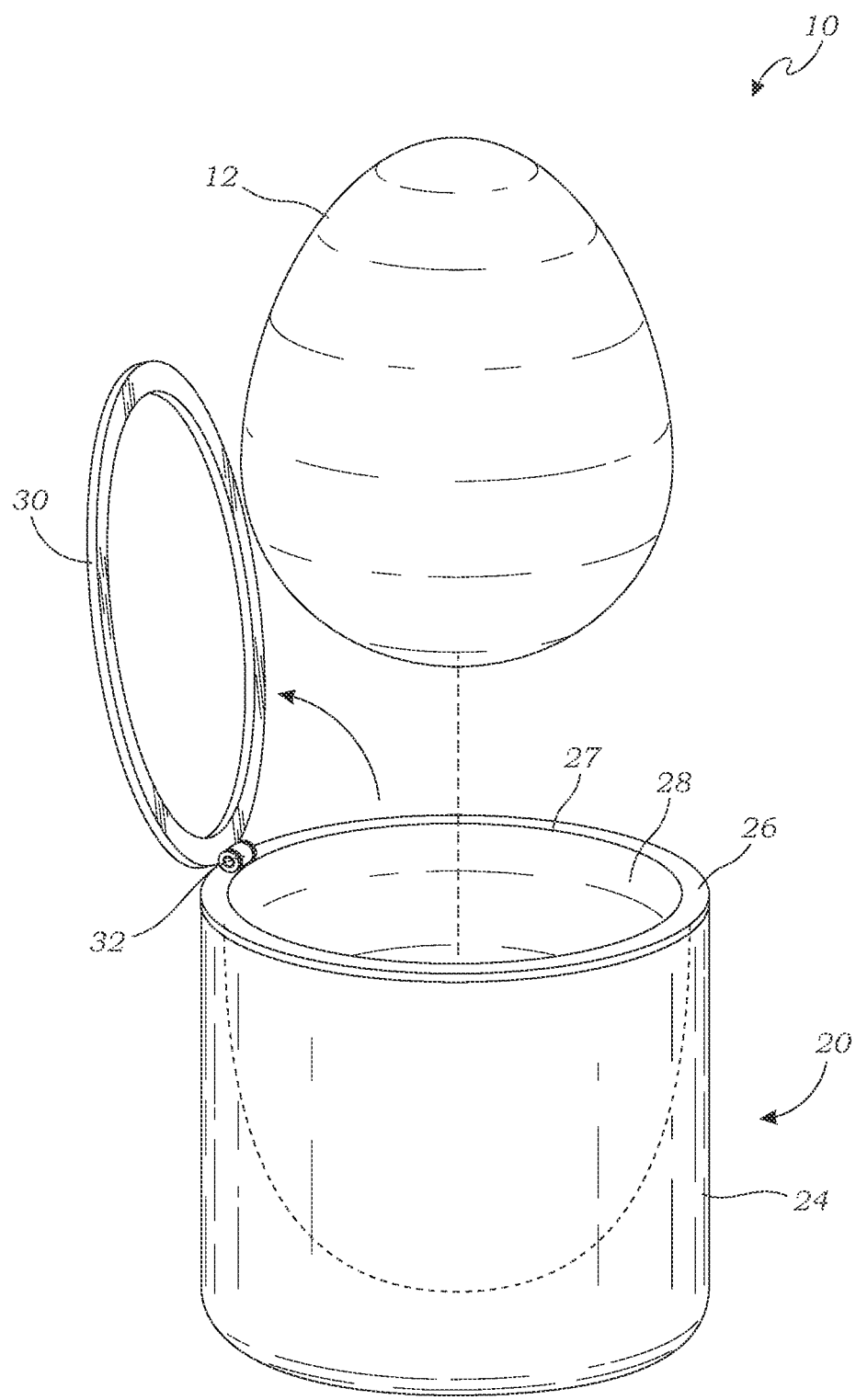
FIG. 2 is an exploded perspective view thereof.

FIG. 2 is an exploded perspective view of the egg cup 10 with the top ring 30 hinged upwardly via the connector 26. As discussed above, the top ring 30 may be smaller in diameter than the top perimeter 26 for holding the egg 12 in place. As shown in FIG. 2, the top ring 30 may be hinged away from the top perimeter 26 by the connector 32, wherein the egg 12 may be placed in the interior chamber 28, and the top ring 30 hinged back down over the egg 12 for being sliced by the knife 14. In some embodiments, there may be a plurality of top rings connected to the top perimeter 26, one example being shown in FIG. 5 and discussed further below.

Figure 3:
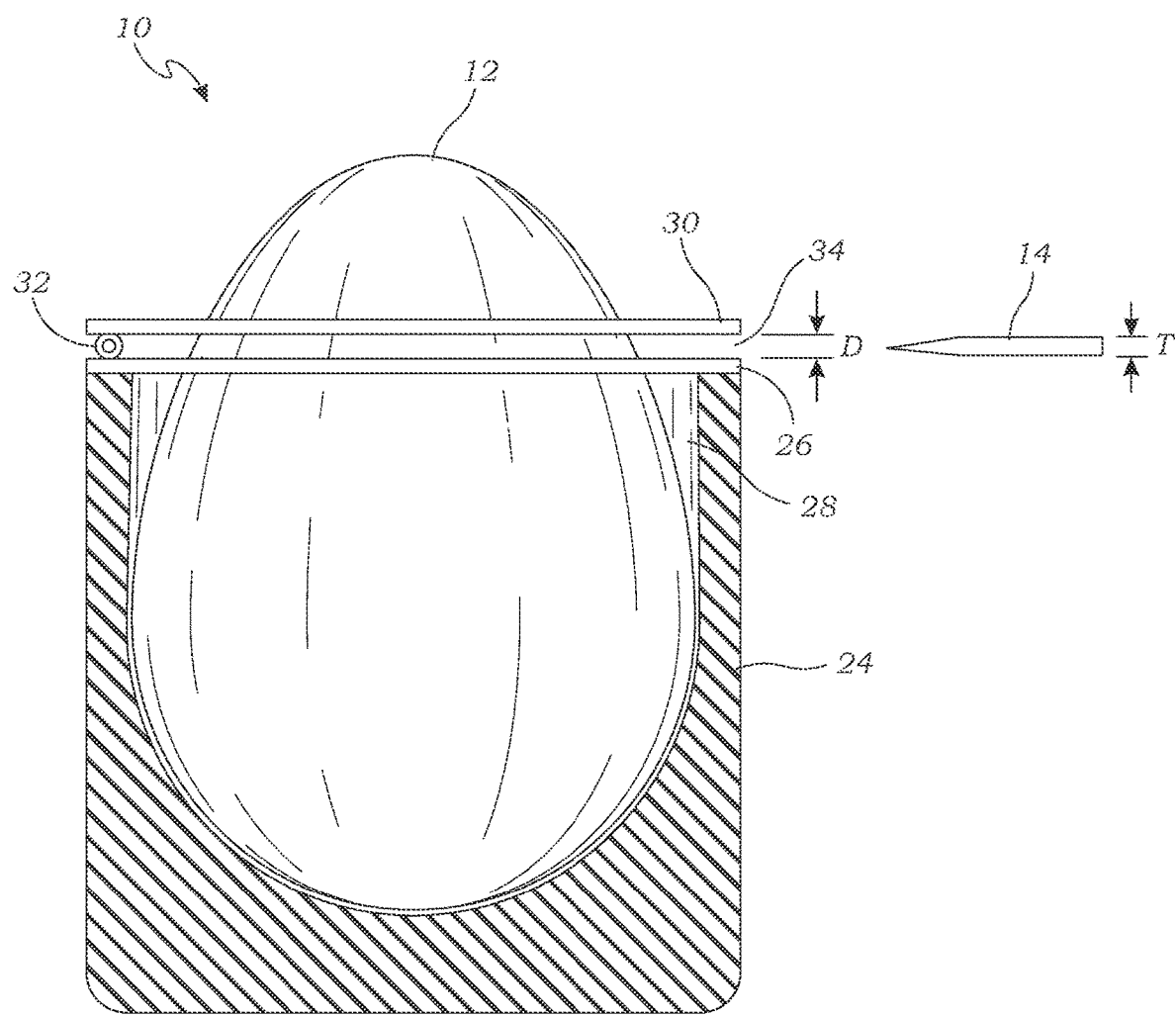
FIG. 3 is a sectional view taken along line 3-3 in FIG. 1.

FIG. 3 is a sectional view taken along line 3-3 in FIG. 1. As shown in FIG. 3, the interior chamber 28 of the main body 20 is shaped and adapted to receive the egg 12 such that it sits inside of the egg cup 10, unlike in the prior art where eggs typically sit "on" an egg cup. The gap 34 formed by the top ring 30 and the top perimeter 26 is a distance D, which is great enough to allow the knife 14 having a thickness T to pass therethrough, thus slicing the egg 12 when it is sitting within the interior chamber 28.

FIG. 4 is a front elevational view of a second embodiment of the egg cup 40. As shown in FIG. 4, in this embodiment, the main body 20 of the egg cup 40 has a first end 42 and a second end 44, the first end 42 having the top perimeter 26, top ring 30, and gap 34 of the embodiment of FIGS. 1-3, except the connector 45 is a strip of rigid material and is not hingeable. As in the previous embodiment, the top perimeter 26 defines the opening 27 that allows access to the interior chamber 28.

The second end 44 includes the same structure as the first end 42, having a bottom perimeter 46 attached to a bottom ring 48 by a connector 49, forming a gap 41. In this embodiment, the connectors 45 and 49 of the top and bottom rings 26 and 48 are each the rigid strip of material, but also may be any type of connector suitable for stopping the knife 14 (hinge, multiple strips, etc.). The bottom perimeter 46 defines an opening 47 that allows access to a lower chamber 50 adapted to receive the egg 12. As shown in FIG. 4, the second end 44 is smaller than the first end 42, such that when the egg cup 40 is flipped over and the egg 12 is placed in the lower chamber 50, the gap 41 is positioned at a different place relative to the egg 12 for slicing with the knife 14. In this manner, the egg cup 40 of FIG. 4 is reversible for slicing at different points on the egg 12, or for using differently sized eggs.

In some embodiments, the interior chamber 28 of the first end 42 and the lower chamber 50 of the second end 44 may be connected such that the main body 20 is hollow, or there may be material between the chambers 28 and 50. Various sizes and proportions of the first and second ends 42 and 44 may be implemented using the teachings of the present invention, and are not limited to the illustration of FIG. 4.

FIG. 5 is a front elevational view of a third embodiment of the egg cup 60. As shown in FIG. 5, in this embodiment, the main body 20 also has a first end 62 and a second end 64, wherein the first end 62 includes the top perimeter 26 that forms the opening 27 to the interior chamber 28, and the second end 64 includes an adjustment mechanism 66, discussed below. In this embodiment, there is a plurality of top rings 68 connected to the connector 32 (in this embodiment a hinge), and the connector 32 connects to the top perimeter 26 of the main body 20.

In this embodiment, the adjustment mechanism 66 in the form of an adjustment dial, wherein rotation of the dial 66 causes a platform 67 of the interior chamber 28 to move upwardly or downwardly as in a lipstick container. When the egg 12 is within the egg cup 60, rotation of the mechanism 66 changed the location of the top rings 68 relative to the egg 12 for cutting at different locations on the egg 12. In alternative embodiments, the adjustment mechanism 66 may be any suitable type of adjustment mechanism, e.g., a click-adjustment, switch, slider, etc.

As shown in FIG. 5, the plurality of top rings 68 may include two top rings forming two gaps for the knife 14 to pass therethrough, but any number of rings 68 may be included, according to the desire of the consumer to slice the egg 12 at specific points on the egg 12. As shown in FIG. 5, the plurality of top rings 68 may be constructed at progressively smaller diameters to match the curvature of the egg 12, however, the top rings 68 and top perimeter 26 may also be approximately equal in diameter.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. An egg cup for cutting an egg with a knife, the egg cup comprising:
   a main body having a base and an upwardly extending sidewall that extends upwardly from a second end to a first end, the first end having an opening that allows access to an interior chamber formed by the main body;
   wherein the interior chamber is shaped to receive the egg;
   a stainless steel bottom ring mounted around the opening at the first end of the main body, wherein the bottom ring is attached via a hinge to a stainless steel top ring;
   wherein the top ring and the bottom ring are spaced apart from each other by the hinge to form a gap therebetween; and
   wherein the gap is sized to receive the knife between the top ring and the bottom ring so that the knife may slice through the egg and stop at the hinge.

2. An egg cup for cutting an egg with a knife, the egg cup comprising:
   a main body having a base and an upwardly extending sidewall that extends upwardly from a second end to a first end;
   an opening in the first end that allows access to an interior chamber formed by the main body, wherein the interior chamber is shaped to receive the egg;
   wherein a bottom ring is mounted around the opening of the first end, and wherein the bottom ring is attached via a hinge to a top ring;
   wherein the top ring and the bottom ring are spaced apart from each other by the hinge to form a gap therebetween;
   wherein the gap is sized to receive the knife between the top ring and the bottom ring so that the knife may slice through the egg and stop at the hinge; and
   wherein the second end includes an adjustment mechanism that includes an adjustment dial, wherein rotation of the dial causes a platform of the interior chamber to move upwardly or downwardly to move the egg relative to the top and bottom rings.

3. The egg cup of claim 2, wherein the top ring includes a plurality of top rings.

4. The egg cup of claim 3, wherein the plurality of top rings have progressively smaller diameters.

5. An egg cup for cutting an egg with a knife, the egg cup comprising:
   a main body having a base and an upwardly extending sidewall that extends upwardly from a second end to a first end;
   an opening in the first end that allows access to an interior chamber formed by the main body, wherein the interior chamber is shaped to receive the egg;
   wherein a bottom ring is mounted around the opening of the first end, and wherein the bottom ring is attached via a hinge to top ring;
   wherein the top ring and the bottom ring are spaced apart from each other by the hinge to form a gap therebetween;
   wherein the gap is sized to receive the knife between the top ring and the bottom ring so that the knife may slice through the egg and stop at the hinge;
   wherein the second end also includes a bottom perimeter that defines an opening that allows access to a lower chamber also adapted to receive the egg; and wherein the bottom perimeter is attached to a bottom ring by a connector, forming a gap; and wherein the second end is smaller than the first end, such that when the egg cup is flipped over and the egg is placed in the lower chamber, the gap is positioned at a different place relative to the egg for slicing with the knife, such that the egg cup is reversible for slicing at different points on the egg, or for cutting differently sized eggs.

\* \* \* \* \*